(12) United States Patent
Burns (10) Patent No.: US 11,920,924 B2
(45) Date of Patent: *Mar. 5, 2024

(54) METHOD AND APPARATUS FOR RELATING MEASUREMENTS WITH COMPARABLE OBJECTS FOR THE PURPOSE OF RECORDING EVIDENCE

(71) Applicant: BSC Forensics, Rosenberg, TX (US)

(72) Inventor: Jarrod C. Burns, Rosenberg, TX (US)

(73) Assignee: BSC Forensics, Rosenberg, TX (US)

( * ) Notice: Subject to any disclaimer, the term of this patent is extended or adjusted under 35 U.S.C. 154(b) by 445 days.

This patent is subject to a terminal disclaimer.

(21) Appl. No.: 15/722,344

(22) Filed: Oct. 2, 2017

(65) Prior Publication Data

US 2018/0080752 A1 Mar. 22, 2018

Related U.S. Application Data

(63) Continuation-in-part of application No. 14/808,665, filed on Jul. 24, 2015, now abandoned.

(60) Provisional application No. 62/119,808, filed on Feb. 24, 2015.

(51) Int. Cl.
*G01B 3/04* (2006.01)
*G01B 3/00* (2006.01)

(52) U.S. Cl.
CPC .............. *G01B 3/04* (2013.01); *G01B 3/004* (2013.01)

(58) Field of Classification Search
CPC .................................. G01B 3/04; G01B 3/004
USPC ...................... 33/1 BB, 494, 483, 759, 679.1
See application file for complete search history.

(56) References Cited

U.S. PATENT DOCUMENTS

| | | | | |
|---|---|---|---|---|
| 3,805,390 A | * | 4/1974 | Craig | B43L 9/007 33/27.03 |
| 5,970,620 A | * | 10/1999 | Campbell | G01B 3/30 33/485 |
| 6,115,932 A | * | 9/2000 | Fedora | G01B 3/1082 33/494 |
| 6,219,930 B1 | * | 4/2001 | Reid | G01B 3/14 33/1 BB |
| 6,341,429 B1 | * | 1/2002 | Herskovitz | A61B 5/444 33/1 BB |
| 6,725,559 B2 | * | 4/2004 | Burt, Jr. | A41H 3/002 33/11 |
| 6,983,544 B2 | * | 1/2006 | Echizenya | G01N 21/88 33/1 BB |

(Continued)

*Primary Examiner* — George B Bennett
(74) *Attorney, Agent, or Firm* — Kearney, McWilliams & Davis, PLLC; William Yarbrough, III (57) ABSTRACT

The invention is a method and measuring device configured for measurement by comparing the an area of interest or object with an object of comparable size and/or shape. This invention may be most useful when recording and classifying evidence. The measuring device should be portable and comprised of a flat, straight elongated member with measuring indicia along one or both the measuring edges, wherein the measuring indicia corresponds with values with labels of the standard sizes of comparable objects. The measuring indicia extends along the length of the measuring edge and the labels indicate the closest sized object. Other measuring indicia along the length of the measuring edge may also correspond to standard measurement units. The method should directly correlate a measurement with a comparable object for the purpose of recording evidence.

14 Claims, 7 Drawing Sheets

(56) References Cited

U.S. PATENT DOCUMENTS

| | | | | |
|---|---|---|---|---|
| 7,331,133 | B2* | 2/2008 | Bauernfeind | B62D 41/00 |
| | | | | 40/600 |
| 8,505,209 | B2* | 8/2013 | Estocado | A61B 5/1072 |
| | | | | 33/1 BB |
| 2006/0156570 | A1* | 7/2006 | James | G01B 3/28 |
| | | | | 33/679.1 |
| 2007/0271806 | A1* | 11/2007 | Dressler | G01B 3/10 |
| | | | | 33/758 |
| 2008/0271330 | A1* | 11/2008 | Bender | A47G 1/205 |
| | | | | 33/365 |
| 2010/0077624 | A1* | 4/2010 | Elias | B43L 7/027 |
| | | | | 33/474 |
| 2010/0088915 | A1* | 4/2010 | Neff | A61B 5/107 |
| | | | | 33/759 |
| 2011/0098539 | A1* | 4/2011 | Estocado | A61B 5/445 |
| | | | | 600/300 |

* cited by examiner

FIG. 2B 200 (Measuring Device)

210 (American or Metric Units)

205a (Standard Objects)
205b
205c
205d
205e
205f
205g
205h
205k
205j
205i

METHOD AND APPARATUS FOR RELATING MEASUREMENTS WITH COMPARABLE OBJECTS FOR THE PURPOSE OF RECORDING EVIDENCE

CROSS-REFERENCE TO OTHER APPLICATIONS

The present disclosure claims priority to provisional patent application 62/119,808 and incorporates by reference and is a continuation of application Ser. No. 14/808,665, with the filing date Jul 24, 2015.

BACKGROUND OF THE INVENTION

The present disclosure relates generally to measuring devices and methods and, more particularly, to a method and apparatus for measuring by comparing an area or object of interest by relating that area or object of interest with an object of comparable size and/or shape through specific indicia.

Field studies are conducted in a variety of industries where evidence must be recorded and measured. Often, for classification purposes or for description purposes, it is useful to compare the evidence size to comparable, common, everyday objects. In certain industries, this becomes particularly important where the evidence cannot be collected or handled, increasing the necessity for thorough and descriptive measurements. When the evidence cannot be directly collected or handled for later, more thorough examination or reporting, the area may sometimes be photographed or described in writing. Certain industries, in particular, come to mind that find accuracy in measurements to be of particular importance: the law enforcement industry or the insurance industry. These measurements used for evidence collection may impact people's lives, livelihoods, or cost them or the insurance company a large amount of money if not done properly or thoroughly. The people taking the measurements may not be able to directly collect evidence, but may instead choose to record the evidence for later classification, study, reporting, or presenting. Some instances where this may be the case would be where large surfaces on streets, houses, or cars may be impacted by a small object like a bullet or a weather-related phenomena like hail, although these examples are not meant to be limiting.

Although the measurers in the industries mentioned and in any other instance when measurements for the purpose of recording information is necessary, may train to assess damage or may train to record evidence, current industry standards rely heavily on visual assessments. Even where there are tools or methods available, those tools are often inconvenient or expensive and do not directly relate the measurements to the result. In many of these situations, the original area or object measured cannot be assessed easily at a later date to verify the information because the site is unavailable or transitory. Therefore, the area or object should be measured accurately and appropriately recorded or described initially so that whoever is assessing, referring to, or being presented the recorded evidence is able to draw important and more accurate conclusions, or is better able to understand the scope. This becomes even more important where the results and conclusions drawn from such evidence recording impacts important aspects of people's lives and livelihoods and where slight variations in standard measurements could result in differing conclusions.

The purpose or end goal of many individuals measuring an area or object is to correlate or compare that area or object with another comparable object. In the case of law enforcement or crime scene technicians, they may be assessing impact damage to correlate it with bullet caliber or an area spattered with blood or some other fluid correlated to a common object for easier classification and assessment. In the case of insurance adjusters or people wanting to claim damage to an insurance company, they may be assessing damage to correlate it with a standard hail size. For hail, for instance, it is already common practice to associate levels of damage with the sizes of common, everyday objects. There are other industries and situations where the recording of evidence through comparison of a measurement with a comparable object would aid people in their ability to carry out their purpose or meet their goals. In any case, it would be advantageous to be able to correlate the area or object measured more directly with a correlatable, common object.

When making measurements, the person measuring, or the "measurer," could look at the following factors: size, the shape, and in some cases a related angle—any or all of which could affect the measurement of an area of interest or object. Size and shape are more easily discernible, but angle may have importance where an object strikes a surface, and the area struck is being measured. Sometimes an object is being inferred from a measurement. For instance, if an object is thought to have caused damage, but that object is not available at the time of the investigation, then the measurements taken may be used to infer what object caused the damage. In the case of weather-related phenomenon, the weather phenomenon may have dissipated or melted at the time of investigation. In other cases, the object may be hidden or lost. In the case of fluids spattered against a surface, the fluids may wash away with time and are difficult to capture. Therefore, indirect measurements become necessary for the proper classification and recordation of evidence, even in cases where the object or area may be available, to provide corroborating evidence. The use of current devices or methods could lead to discrepancies or errors in measurement or recording leading to compounding error that may be introduced.

Currently, although some tools and methods may be limitedly available, most people do not have access to these tools, may find them cumbersome, or the tools and methods may leave room for inaccurate measurements. Often, the current standard practice is to use a combination of visual approximations, memory, and a measuring tape or ruler.

Therefore, there exists a need in these industries and probably others for a more direct, efficient, and portable method and device in order to correlate measurements with comparable objects for the purposes of recording and classifying evidence.

SUMMARY OF THE INVENTION

The present invention relates to a portable measuring device or measuring method for correlating an area of interest or object with a comparable, common object represented with the use of specific indicia. The measuring device, comprising a flat, straight, elongated body graduated with measuring indicia on at least one measuring edge extending along a finite length of device. The measuring indicia comprises values with a plurality of labels corresponding to the sizes of comparable objects with which to compare the area of interest or object. The labels correspond to comparable objects and enable a measurer to compare the measurement to known objects when evaluating, recording and/or photographing evidence thereby facilitating the assessment and classification of that evidence. Evidence, in this context, refers specifically to the use of the information in forensic examinations of an area. The forensic examinations are typically within the insurance evaluation or in a criminal investigation. The measuring method comprises the steps of placing a measuring tool on or next to an area of interest or object and recording the measurement taken in a manner that can be assessed or reviewed later in time, where the information recorded relates the measurement taken to a common object. The recording of evidence is often in photographic or videographic form.

The measuring device may additionally include measuring indicia on a measuring edge extending along a finite length of the device with labels corresponding to American or Metric units.

The measuring device may additionally comprise a two axes chart pivotally mounted on the device or placed directly on the device for determining an angle of impact. This chart would be similar to a logarithmic chart, using measurement of the length and width of an impacted surface, and correlating those measurements with an approximate angle of impact.

A complete understanding of the invention will be obtained from the following description when taken in connection with the accompanying drawing figures wherein like reference characters identify like parts throughout. However, these embodiments should not be construed as limitations on the scope of any embodiment, but as exemplifications of various embodiments thereof. Many other variations are possible within the teachings of the various embodiments. Thus, the scope should be determined by the appended claims and their equivalents, and not by the examples given.

DETAILED DESCRIPTION OF THE INVENTION

For a thorough understanding of the present disclosure, reference is to be made to the following detailed description. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the present disclosure. Further, it will nevertheless be understood that no limitation in the scope of the disclosure is thereby intended, such alterations and further modifications in the figures and such further applications of the principles of the disclosure, as illustrated therein being contemplated as would normally occur to one skilled in the art to which the disclosure relates. Also, it is to be understood that the phraseology and terminology used herein is for the purpose of description and should not be regarded as limiting. Further, reference herein to "one embodiment" or "an embodiment" means that a particular feature, characteristic, or function described in connection with the embodiment is included in at least one embodiment of the disclosure. Furthermore, the appearances of such phrase at various places herein are not necessarily all referring to the same embodiment. The terms "a" and "an" herein do not denote a limitation of quantity, but rather denote the presence of at least one of the referenced item.

The present disclosure provides a device and method for measurement by comparing an area of interest or object to a comparable object for the purpose of recording evidence. The present disclosure's tool and the method for using such tool allows measurers to more directly, accurately, and efficiently record evidence, particularly where there are few portable tools available to the measurer. An example of the use of proposed measuring device may be, an individual who runs out after a storm to assess the damage to his or her roof or car. Another example may be an insurance adjuster who has been asked to investigate the validity of an insurance claim who must infer the size of the hailstones and also the angle by measuring a variety of surfaces damaged by hail and record those measurements and sizes for evaluation. The last example given, though there may be many other instances where a surface is not struck, could be a law enforcement professional or crime scene technician who may determine the caliber of a bullet from an impacted surface for the purpose of recording or classifying the evidence for further investigation.

Currently, measurers use a combination of visual approximations, memory, and a traditional measuring tape or ruler to later correlate measurements with an object or a classification category. As in the above examples, the classification and recording of these measurements could have great impact on other people and on investigations. Therefore, relying on measurements that are later classified, visual approximations, and memory might not only lead to inaccuracy in the measurement or the inference, but also inaccuracy in the classification of the evidence collected. In conclusion, there are many circumstances at which human error may distort the accuracy of the information measured and/or recorded. Therefore, a new tool or method that could eliminate some sources of error could allow for the more direct, efficient and accurate measurement.

Figure 1:
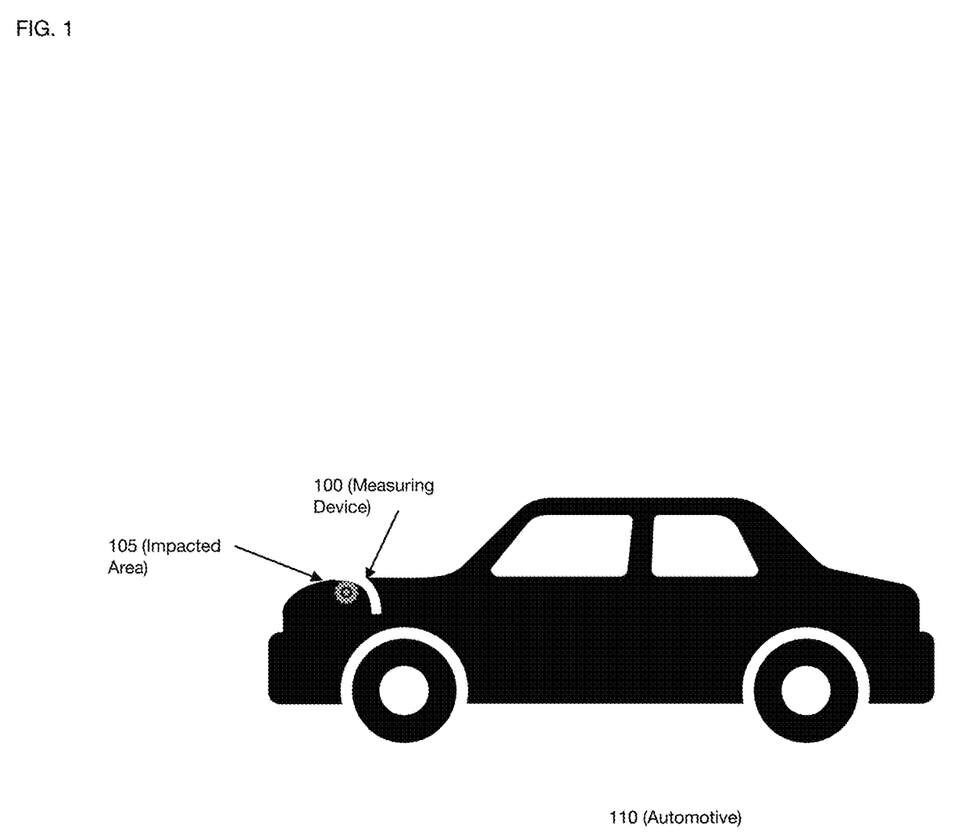
FIG. 1 is an exemplary view of the forensic evidence measuring device used in the field for evidence collection and recordation purposes.

FIG. 1 depicts a pliable measuring device [100] next to an impacted area [105], where both are shown on the curved surface of a automotive [110]. The pliable measuring device [100] is shown to be of a portable size for ease of use in a field setting.

Figure 2A:
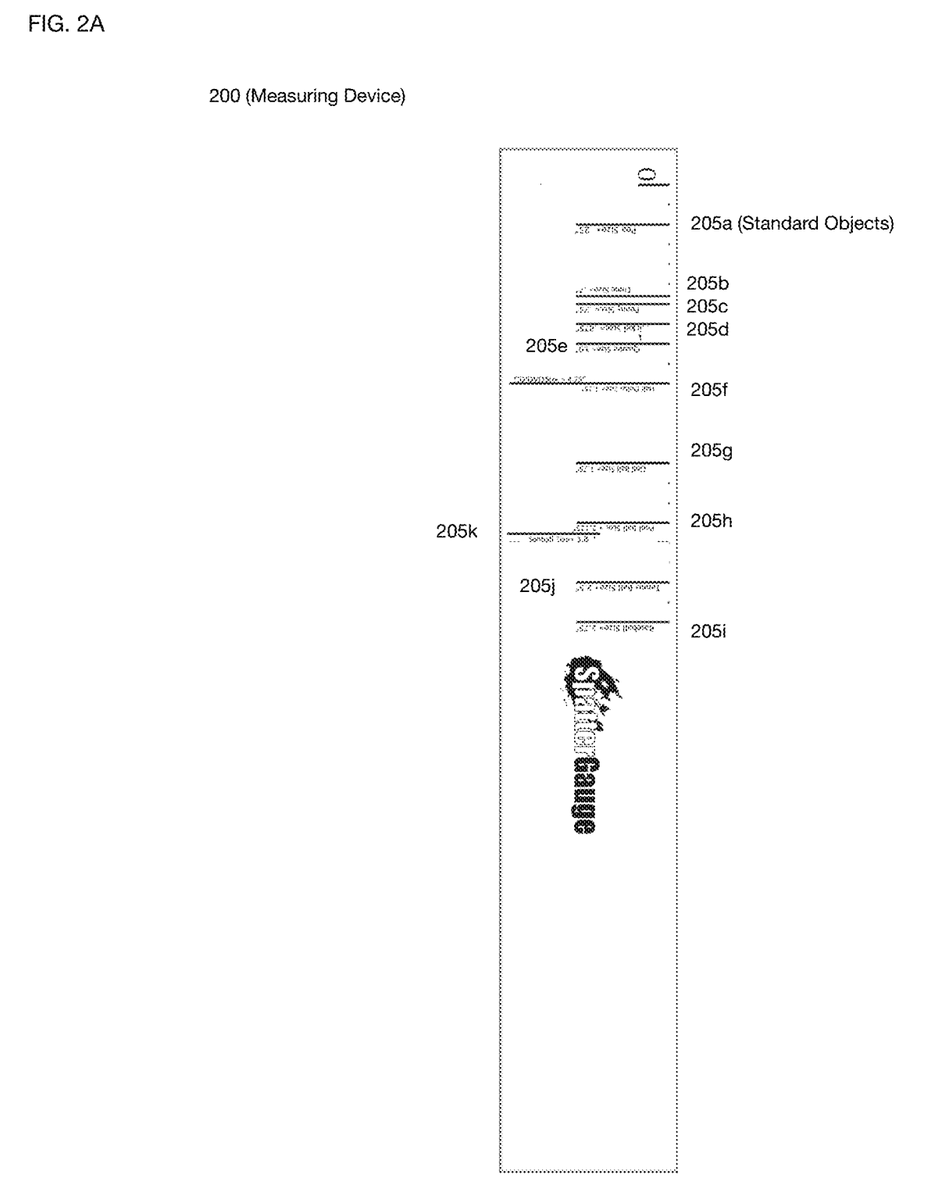
FIG. 2A is a plan view of the forensic evidence measuring device comprising measuring indicia corresponding to standard hail or ice sizes.

FIG. 2A, illustrates a plan view of a evidence measuring device [200]. The evidence measuring device [100] has marks intermittently along one edge of the device [205a-205k] that correspond with common objects. The common objects correspond to standard objects used to classify forensic insurance evidence. The standard objects are those used in the forensic insurance industry to classify weather damage by hail or ice and are determined by the National Oceanic and Atmospheric Administration (Table 1). For the portable, evidence measuring device [200], the marks corresponding to the standard objects [205-260] allows for additional ease of use for photographing or otherwise recording the evidence and also reduces errors in the field.

TABLE 1

(Reproduced from NOAA Website)

| Hailstone size | Measurement | |
| --- | --- | --- |
| | In. | cm. |
| bb | <1/4 | <0.64 |
| Pea | 1/4 | 0.64 |
| Dime | 7/10 | 1.8 |
| Penny | 3/4 | 1.9 |
| Nickel | 7/8 | 2.2 |
| Quarter | 1 | 2.5 |
| Half dollar | 1 1/4 | 3.2 |
| Golf ball | 1 3/4 | 4.4 |
| Billiard ball | 2 1/8 | 5.4 |
| Tennis ball | 2 1/2 | 6.4 |
| Baseball | 2 3/4 | 7.0 |
| Softball | 3.8 | 9.7 |
| Compact disc/DVD | 4 3/4 | 12.1 |

Figure 2B:
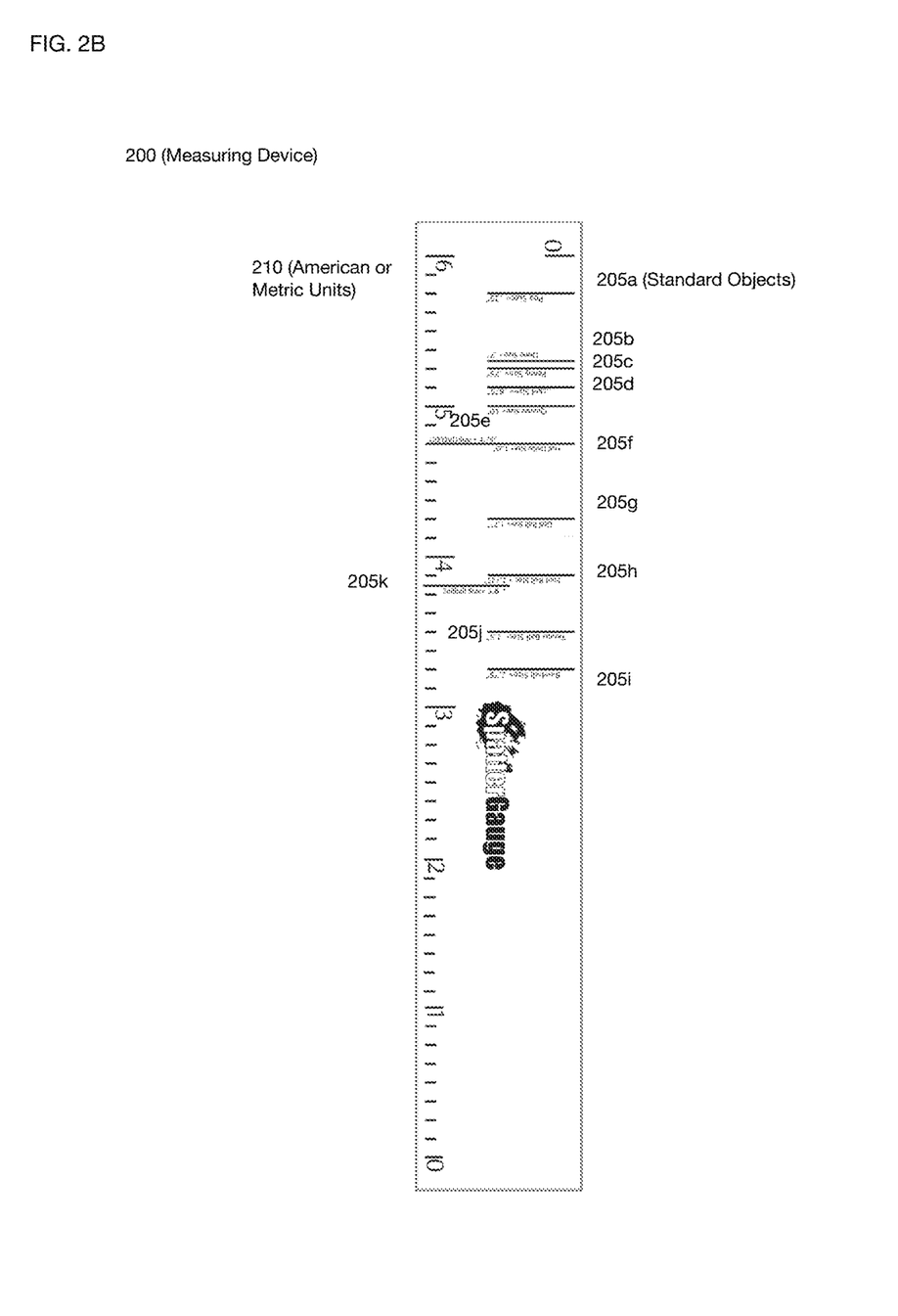
FIG. 2B is a plan view of the forensic evidence measuring device comprising measuring indicia corresponding to standard hail or ice sizes with the addition of American or Metric units also marked on the measuring device.

FIG. 2B depicts a plan view of an evidence measuring device [200]. The evidence measuring device [200] has marks intermittently along one edge of the device [205a-205k] that correspond with common objects. The common objects correspond to standard objects used to classify forensic insurance evidence. The standard objects are those used in the forensic insurance industry to classify weather damage by hail or ice and are determined by the National Oceanic and Atmospheric Administration (Table 1). Additionally, the evidence measuring device [200] has markings at equally spaced intervals [210] that correspond with standard American or Metric units. For the portable, evidence measuring device [200], the marks corresponding to the standard objects [205a-205k] allows for additional ease of use for photographing or otherwise recording the evidence and also reduces errors in the field. Additionally, the addition of standard American or Metric units [210] allows for additional measurements to be made, if necessary, and increases versatility.

Figure 3A:
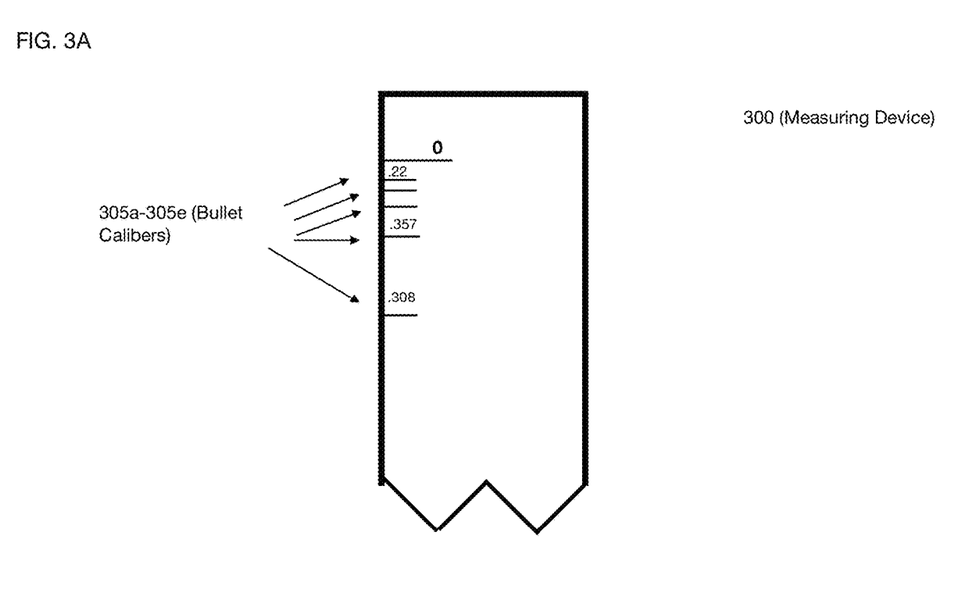
FIG. 3A is a plan view of the forensic evidence measuring device comprising measuring indicia corresponding to standard bullet calibers.
Figure 3B:
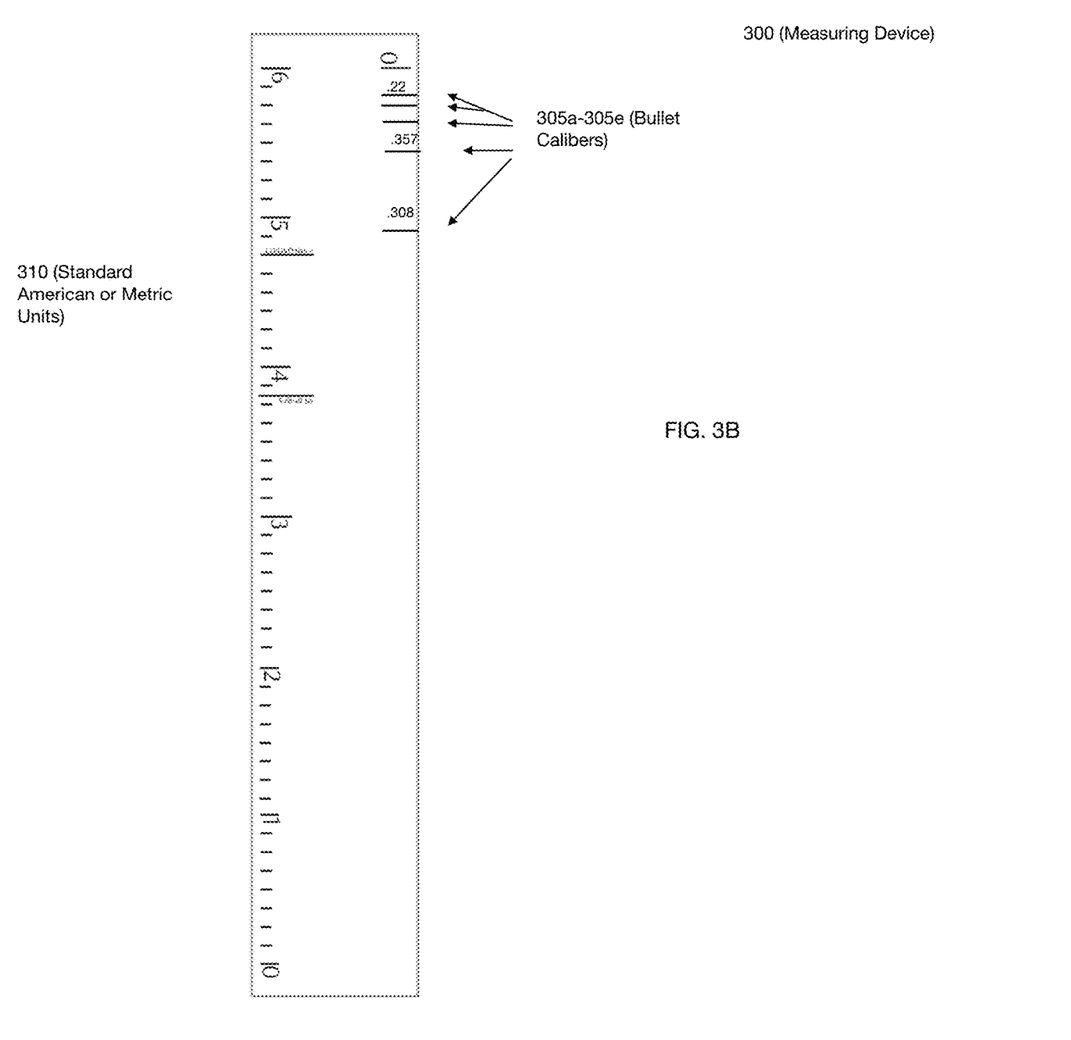
FIG. 3B is a plan view of the forensic evidence measuring device comprising measuring indicia corresponding to standard bullet calibers with the addition of American or Metric units also marked on the measuring device.

FIG. 3A depicts a plan view of an evidence measuring device [300]. The evidence measuring device [300] has marks intermittently along one edge of the device [305a-305] that correspond with standard bullet calibers. The bullet calibers are standard in the industry and correspond to standard gun barrel sizes. These bullet calibers are used to classify forensic criminal evidence. Additionally, FIG. 3B depicts the evidence measuring device [300] has markings at equally spaced intervals [310] that correspond with standard American or Metric units. For the portable, evidence measuring device [300], the marks corresponding to the standard objects [305a-305] allows for additional ease of use for photographing or otherwise recording the evidence and also reduces errors in the field. Additionally, the addition of standard American or Metric units [310] allows for additional measurements to be made, if necessary, and increases versatility.

Figure 4A:
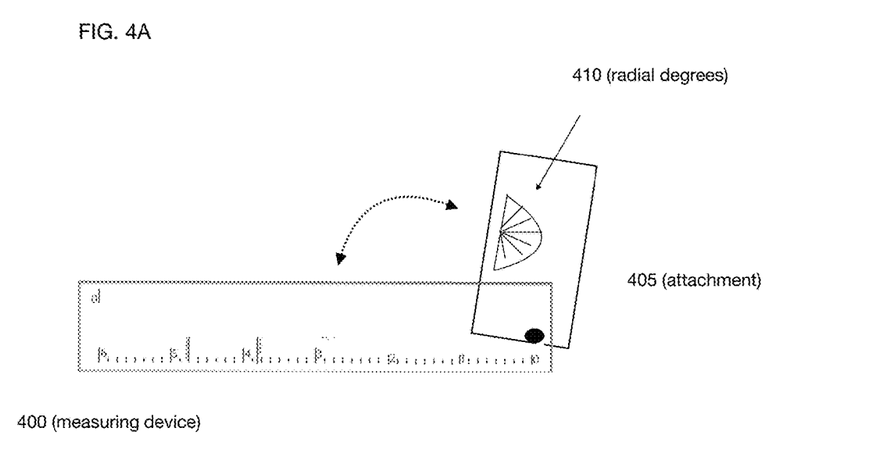
FIG. 4 is a plan view of a forensic evidence measuring device with a pivotally connected attachment for measuring or determining degree of impact.
Figure 4B:
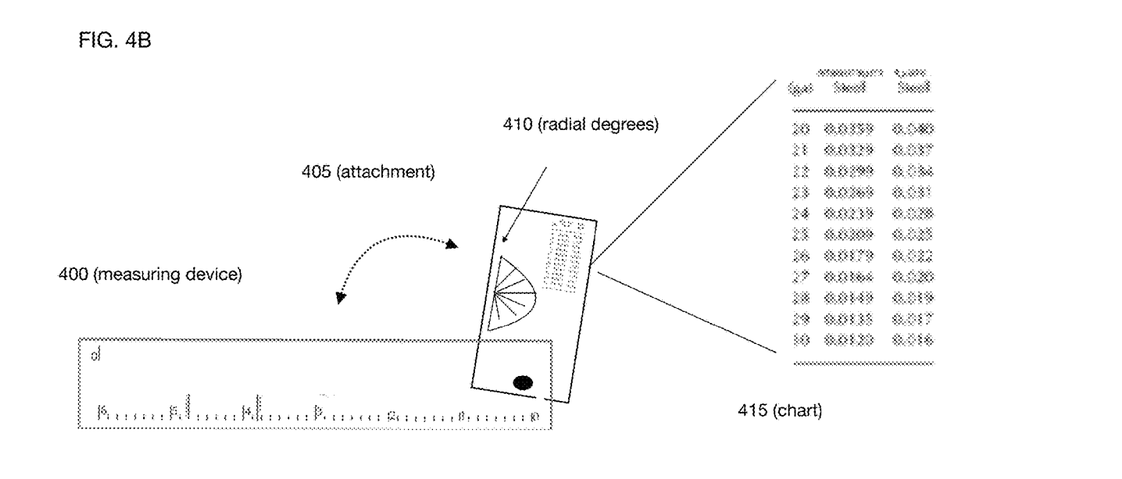

FIG. 4A depicts an evidence measuring device [400] that may have been depicted in FIG. 3A, 3B, FIG. 2A, or 2B, with an additional pivotally connected second rectangular measuring attachment [405]. The second measuring attachment [405] has a measuring area made up of radial degrees arranged in a semi-circle [410] to additionally record potential angles of impact. FIG. 4B additionally depicts a chart [415] directly printed on the attachment [405] used to correlate the measured length and width of the area of impact with an angle of impact. The chart [415] is printed in an area and of a size that would not obscure any measuring indicia on the measuring device [400]. Alternatively, the angle of impact may be mathematically displayed in a graphical manner, such as a logarithmic scale. This additional information allows for more useful evidence for recording purposes and a more direct measurement of this information in the field.

The measuring device of the present invention may be useful while recording evidence that cannot easily be collected. The evidence may be recorded for later classification or examination. The lightweight and hand-held structural dimensions may result in easy mobility, usage and storage. The device may be constructed using a rigid or non-rigid material and may be of a square or rectangular shape. In an embodiment, the device may be constructed of a transparent material to aid in measurement of an impacted surface by allowing a clear line of sight through the device to the surface or object to be measured.

Figure 5:
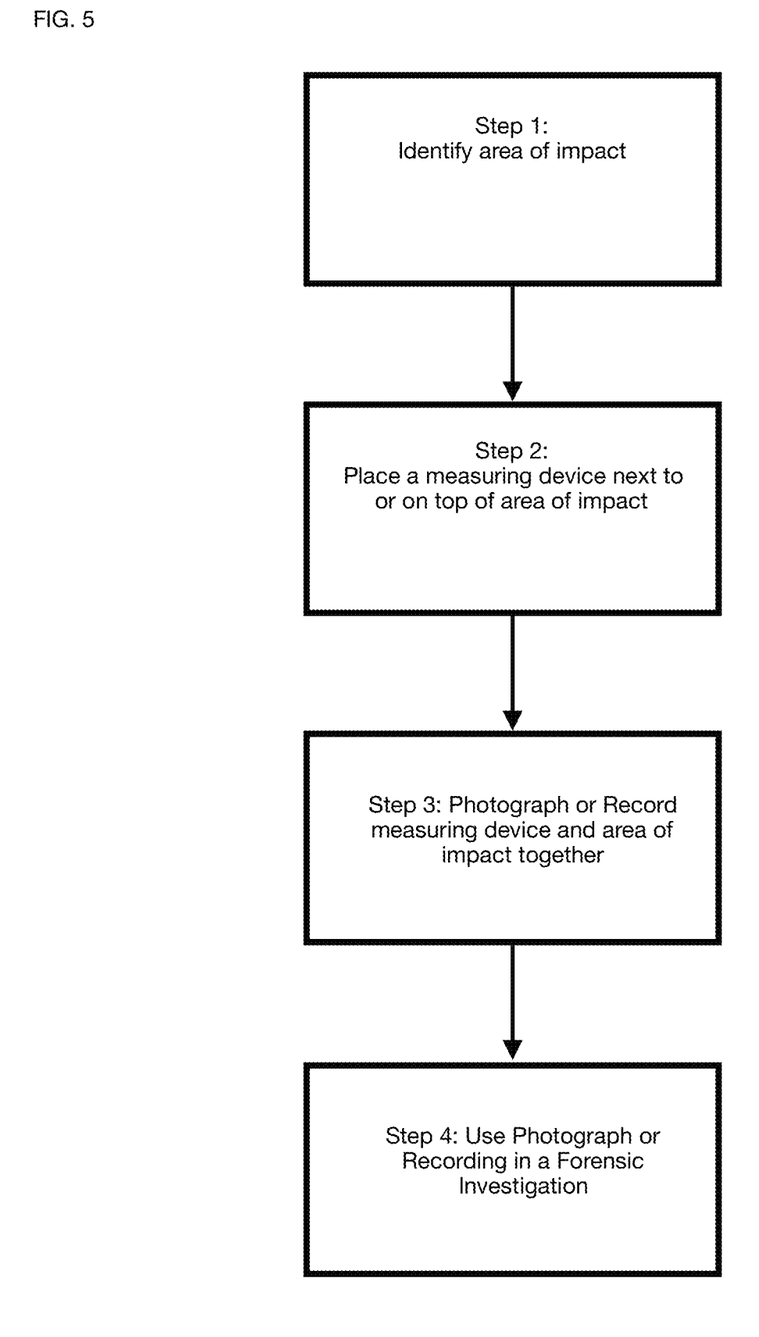
FIG. 5 is an exemplary view of the method for measuring forensic evidence more directly.

FIG. 5 depicts the steps that are taken for recording evidence in a more direct method with fewer opportunities for error. The first step is identifying the area of impact that should be recorded [S1]. The second step, once the area of impact is identified [S1], is to place a measuring device on or next to the area of impact [S2] for evidentiary purposes. Ideally, the measuring device would directly relate the area of impact with relevant information to the investigator. That relevant information may be standard comparable objects. The third step is to photograph or otherwise record the impacted area with the measuring device [S3]. Finally, the recorded evidence will be used as evidence in a forensic investigation [S4]. The recorded evidence may be used in a forensic investigation so that, insurance claims, extent of damage, or other information can be inferred from the impacted area. In criminal investigations, the evidence recorded may be used to assess the weapons used or to infer relevant information about the crime which took place. The use of a measuring device which directly relates the impacted area height, width, or diameter with standards used in the industry reduce the errors in the field.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure. For example, some alternative embodiments have been suggested to exemplify the versatility of the present disclosure but others may also be contemplated.

Preferred embodiments are described herein, including the best mode known to the inventor. Of course, variations of those preferred embodiments will become apparent to those of ordinary skill in the art upon reading the foregoing description. The inventor expects skilled artisans to employ such variations as appropriate. Moreover, any combination of the above-described elements in all possible variations thereof is encompassed unless otherwise indicated herein or otherwise clearly contradicted by context.

What is claimed is:

1. A portable measuring device configured to aid in visual assessment, measurement and recording of an area with the dimensions of a comparable object comprising:
   a flat, straight elongated member with at least one measuring edge; and
   measuring indicia, extending along the length of the measuring device's edge, comprising values with labels corresponding to objects of a comparable size
   wherein said objects of comparable size comprise the following indicia:
   bb size, less than ¼ inch (less than 0.64 cm);
   pea-sized, ¼ in (0.64 cm);
   dime size, 7/10 inch (1.8 cm);
   penny size, ¾ inch (1.9 cm);
   nickel size, ⅞ inch (2.2 cm);
   quarter size, 1 inch (2.5 cm);
   half dollar size, 1¼ inches (3.2 cm);
   golf ball size, 1¾ inch (4.4 cm);
   billiard ball size, 2⅛ inches (5.4 cm);
   tennis ball size, 2½ inches (6.4 cm);
   baseball size, 2¾ inches (7 cm);
   softball size, 3.8 inches (9.7 cm); and
   compact disc/DVD, 4¾ inches, (12.1 cm).

2. The measuring device as claimed in claim 1, wherein said measuring device may additionally comprise a pivotally mounted second axis.

3. The measuring device as claimed in claim 2, wherein said measuring device may measure both length and width of an impacted surface as to determine angle of impact.

4. The measuring device as claimed in claim 1, further comprises an additional set of measuring indicia with corresponding labels referencing American units, metric (SI) units, or a combination thereof.

5. The measuring device as claimed in claim 1, where said measuring device is constructed from a transparent material.

6. The measuring device as claimed in claim 1, where said measuring device is constructed from a lightweight, rigid material or a non-rigid material.

7. The measuring device as claimed in claim 3, where said measuring device may exhibit meteorologic indicia, bullet caliber indicia, blood splatter indicia or fluid splatter indicia and/or traditional American and metric measurements.

8. A device for measuring areas of a surfaces impacted by an object or substance, the device comprising:
   an elongated member comprising at least one measuring edge with a finite length; and
   at least one set of measuring indicia extending along the length of said at least one measuring edge, comprising standard American units, Metric (SI) units, values with labels corresponding to objects of a comparable size, or a combination thereof;
   wherein said objects of comparable size comprise the following indicia:
   bb size, less than ¼ inch (less than 0.64 cm);
   pea-sized, ¼ in (0.64 cm);
   dime size, 7/10 inch (1.8 cm);
   penny size, ¾ inch (1.9 cm);
   nickel size, ⅞ inch (2.2 cm);
   quarter size, 1 inch (2.5 cm);
   half dollar size, 1¼ inches (3.2 cm);
   golf ball size, 1¾ inch (4.4 cm);
   billiard ball size, 2⅛ inches (5.4 cm);
   tennis ball size, 2½ inches (6.4 cm);
   baseball size, 2¾ inches (7 cm);
   softball size, 3.8 inches (9.7 cm); and
   compact disc/DVD, 4¾ inches, (12.1 cm).

9. The device as claimed in claim 8, where said finite length is less than or equal to eight inches.

10. The device as claimed in claim 8, where said standard measuring indicia may be used for measuring and recording bullet caliber data or fluid spatter data.

11. The device as claimed in claim 8, where an additional said set of measuring indicia with corresponding labels located adjacent to and extending along a length of one said measuring edge also include American or metric units.

12. The device as claimed in claim 8, where said measuring device is constructed of a transparent material.

13. The measuring device as claimed in claim 12, where said measuring device is constructed from a rigid material.

14. The measuring device as claimed in claim 12, where said measuring device is constructed from a non-rigid material.

* * * * *